(12) United States Patent
Champagne et al.

(10) Patent No.: US 6,925,477 B1
(45) Date of Patent: Aug. 2, 2005

(54) TRANSFERRING RECORDS BETWEEN TWO DATABASES

(75) Inventors: Darryl G. Champagne, Litchfield, NH (US); Robert C. Daley, Nashua, NH (US); Glen A. Walant, Nashua, NH (US)

(73) Assignee: Intellisync Corporation, San Jose, CA (US)

( * ) Notice: Subject to any disclaimer, the term of this patent is extended or adjusted under 35 U.S.C. 154(b) by 0 days.

(21) Appl. No.: 09/052,769

(22) Filed: Mar. 31, 1998

(51) Int. Cl.⁷ .............................................. G06F 17/30
(52) U.S. Cl. ...................... 707/203; 707/201; 345/333; 345/335
(58) Field of Search ................................. 707/506, 203, 707/520, 540, 201; 345/335, 333; 395/348

(56) References Cited

U.S. PATENT DOCUMENTS

| | | |
|---|---|---|
| 4,162,610 A | 7/1979 | Levine |
| 4,432,057 A | 2/1984 | Daniell et al. .............. 395/608 |
| 4,807,154 A | 2/1989 | Scully et al. |
| 4,807,155 A | 2/1989 | Cree et al. |
| 4,807,182 A | 2/1989 | Queen ........................ 395/144 |
| 4,817,018 A | 3/1989 | Cree et al. |
| 4,819,156 A | 4/1989 | DeLorme et al. ...... 395/182.13 |
| 4,819,191 A | 4/1989 | Scully et al. |
| 4,827,423 A | 5/1989 | Beasley et al. ............. 364/468 |
| 4,831,552 A | 5/1989 | Scully et al. |
| 4,866,611 A | 9/1989 | Cree et al. .................. 395/600 |
| 4,875,159 A | 10/1989 | Cary et al. .................. 395/619 |
| 4,939,689 A | 7/1990 | Davis et al. |
| 4,956,809 A | 9/1990 | George et al. .............. 395/601 |
| 4,980,844 A | 12/1990 | Demjanenko et al. ...... 364/550 |
| 5,065,360 A | 11/1991 | Kelly ........................... 395/800 |
| 5,124,912 A | 6/1992 | Hotaling et al. |
| 5,134,564 A | 7/1992 | Dunn et al. |

(Continued)

OTHER PUBLICATIONS

USSN 08/927,922, filed Sep. 11, 1997.

USSN 08/964,751, filed Nov. 05, 1997.

USSN 09/036,400, filed Mar. 05, 1998.

Chapura, Inc., *3 Compare*, http://www.chapura.com/3compare.html (1997).

Cobb et al., "Paradox 3.5 Handbook 3rd Edition," Bantam, pp. 803–816 (1991).

"FRx Extends Reporting Power of Platinum Series: (IBM Desktop Software's Line of Accounting Software)," Doug Dayton, PC Week, v. 8, n. 5, p. 29(2) (Feb. 4, 1991).

(Continued)

*Primary Examiner*—Charles Rones
(74) *Attorney, Agent, or Firm*—Fish & Richardson P.C.

(57) ABSTRACT

In order to transfer data between two databases, a computer program automatically establishes a field map between the record structures of the two databases using information identifying the record structure of one of the databases. The field map is established automatically by correlating a first plurality of the fields of the first database to a second plurality of the fields of the second database to establish a field map. The data stored in the first plurality of fields of a plurality of the records of the first database is then translated in accordance with the field map. The information identifying the record structure of one of the databases identifies the record structure according to a selected field identification protocol identifying the categories and properties of the fields in the record structure of that database. This information may be transmitted to the computer program ahead of any data transfer so that a data transfer protocol, including the field map, may be established prior to the start of the data transfer.

56 Claims, 6 Drawing Sheets

Microfiche Appendix Included

U.S. PATENT DOCUMENTS

| | | | |
|---|---|---|---|
| 5,136,707 A | 8/1992 | Block et al. ................ 395/600 |
| 5,142,619 A | 8/1992 | Webster, III ................ 395/161 |
| 5,155,850 A | 10/1992 | Janis et al. ................ 395/600 |
| 5,170,480 A | 12/1992 | Mohan et al. ............. 395/600 |
| 5,187,787 A | 2/1993 | Skeen et al. ................ 395/600 |
| 5,197,000 A | 3/1993 | Vincent |
| 5,201,010 A | 4/1993 | Deaton et al. |
| 5,210,868 A | 5/1993 | Shimada et al. ............ 395/615 |
| 5,220,540 A | 6/1993 | Nishida et al. |
| 5,228,116 A | 7/1993 | Harris et al. .................. 395/54 |
| 5,237,678 A | 8/1993 | Kuechler et al. ........... 395/600 |
| 5,251,151 A | 10/1993 | Demjanenko et al. ...... 364/550 |
| 5,251,291 A | 10/1993 | Malcolm .................... 395/161 |
| 5,261,045 A | 11/1993 | Scully et al. ............... 395/161 |
| 5,261,094 A | 11/1993 | Everson et al. ............. 395/617 |
| 5,272,628 A | 12/1993 | Koss .................... 364/419.19 |
| 5,276,876 A | 1/1994 | Coleman et al. |
| 5,278,978 A * | 1/1994 | Demers et al. ............. 707/101 |
| 5,278,982 A | 1/1994 | Daniels et al. ............. 395/600 |
| 5,283,887 A | 2/1994 | Zachery ..................... 395/500 |
| 5,293,627 A | 3/1994 | Kato et al. .................. 395/550 |
| 5,301,313 A | 4/1994 | Terada et al. ............... 395/600 |
| 5,315,709 A | 5/1994 | Alston, Jr. et al. .......... 395/606 |
| 5,323,314 A | 6/1994 | Baber et al. |
| 5,327,555 A | 7/1994 | Anderson .................... 395/617 |
| 5,333,252 A * | 7/1994 | Brewer, III et al. ........ 707/506 |
| 5,333,265 A | 7/1994 | Orimo et al. ................ 395/200 |
| 5,333,316 A | 7/1994 | Champagne et al. ....... 395/600 |
| 5,339,392 A | 8/1994 | Risberg et al. ............. 395/161 |
| 5,339,434 A | 8/1994 | Rusis ........................ 395/700 |
| 5,355,476 A | 10/1994 | Fukumura .................. 395/600 |
| 5,375,234 A | 12/1994 | Davidson et al. ........... 395/600 |
| 5,392,390 A * | 2/1995 | Crozier ...................... 345/335 |
| 5,396,612 A | 3/1995 | Huh et al. ................... 395/575 |
| 5,412,801 A | 5/1995 | de Remer et al. |
| 5,421,012 A | 5/1995 | Khoyi et al. |
| 5,434,994 A | 7/1995 | Shaheen et al. ............ 395/617 |
| 5,444,851 A | 8/1995 | Woest ...................... 395/200.1 |
| 5,455,945 A | 10/1995 | VanderDrift |
| 5,463,735 A | 10/1995 | Pascucci et al. .......... 395/200.1 |
| 5,475,833 A | 12/1995 | Dauerer et al. ............. 395/617 |
| 5,511,188 A | 4/1996 | Pascucci et al. ............ 395/600 |
| 5,519,606 A | 5/1996 | Frid-Nielsen et al. ....... 395/228 |
| 5,530,853 A | 6/1996 | Schell et al. |
| 5,530,939 A | 6/1996 | Mansfield, Jr et al. |
| 5,557,518 A | 9/1996 | Rosen |
| 5,560,005 A | 9/1996 | Hoover et al. ............... 395/600 |
| 5,568,402 A | 10/1996 | Gray et al. ............. 364/514 C |
| 5,581,753 A | 12/1996 | Terry et al. |
| 5,581,754 A | 12/1996 | Terry et al. |
| 5,583,793 A | 12/1996 | Gray et al. ............. 364/514 C |
| 5,596,574 A | 1/1997 | Perlman et al. |
| 5,600,834 A | 2/1997 | Howard ...................... 395/617 |
| 5,608,865 A | 3/1997 | Midgely et al. |
| 5,613,113 A | 3/1997 | Goldring .................... 395/618 |
| 5,615,109 A | 3/1997 | Eder |
| 5,615,364 A | 3/1997 | Marks ........................ 395/618 |
| 5,619,689 A | 4/1997 | Kelly ......................... 395/617 |
| 5,623,540 A | 4/1997 | Morrison et al. |
| 5,630,081 A * | 5/1997 | Rybicki et al. ............. 395/348 |
| 5,649,182 A | 7/1997 | Reitz |
| 5,659,741 A | 8/1997 | Eberhardt |
| 5,666,530 A | 9/1997 | Clark et al. ................. 395/617 |
| 5,666,553 A * | 9/1997 | Crozier ...................... 707/540 |
| 5,671,407 A | 9/1997 | Demers et al. |
| 5,682,524 A | 10/1997 | Freund et al. ............. 395/605 |
| 5,684,984 A | 11/1997 | Jones et al. ................ 395/610 |
| 5,684,990 A * | 11/1997 | Boothby ..................... 707/203 |
| 5,689,706 A | 11/1997 | Rao et al. |
| 5,701,423 A * | 12/1997 | Crozier ....................... 345/335 |
| 5,704,029 A | 12/1997 | Wright, Jr. |
| 5,706,452 A | 1/1998 | Ivanov |
| 5,706,509 A | 1/1998 | Tso |
| 5,708,812 A | 1/1998 | Van Dyke et al. .......... 395/712 |
| 5,708,840 A | 1/1998 | Kikinis et al. .............. 395/800 |
| 5,710,922 A | 1/1998 | Alley et al. ................. 395/617 |
| 5,727,202 A | 3/1998 | Kucala ....................... 395/610 |
| 5,729,735 A | 3/1998 | Meyering ................... 395/610 |
| 5,737,539 A | 4/1998 | Edelson et al. |
| 5,745,712 A * | 4/1998 | Turpin et al. ................ 345/333 |
| 5,758,083 A | 5/1998 | Singh et al. |
| 5,758,150 A | 5/1998 | Bell et al. ................... 395/610 |
| 5,758,337 A | 5/1998 | Hammond ..................... 707/6 |
| 5,758,355 A | 5/1998 | Buchanan ................... 707/201 |
| 5,778,388 A | 7/1998 | Kawamura et al. ......... 707/203 |
| 5,781,908 A | 7/1998 | Williams et al. |
| 5,790,789 A | 8/1998 | Suarez .................. 395/200.32 |
| 5,809,494 A | 9/1998 | Nguyen |
| 5,813,009 A | 9/1998 | Johnson et al. |
| 5,813,013 A | 9/1998 | Shakib et al. ............... 707/102 |
| 5,819,272 A | 10/1998 | Benson |
| 5,819,274 A | 10/1998 | Jackson, Jr. |
| 5,832,218 A | 11/1998 | Gibbs et al. |
| 5,832,489 A | 11/1998 | Kucala |
| 5,838,923 A | 11/1998 | Lee et al. |
| 5,845,293 A | 12/1998 | Veghte et al. ............... 707/202 |
| 5,857,201 A | 1/1999 | Wright, Jr. et al. ...... 707/104.1 |
| 5,870,759 A | 2/1999 | Bauer et al. ................. 707/201 |
| 5,870,765 A | 2/1999 | Bauer et al. ................. 707/203 |
| 5,875,242 A | 2/1999 | Glaser et al. |
| 5,877,760 A | 3/1999 | Onda et al. |
| 5,878,415 A | 3/1999 | Olds |
| 5,884,323 A * | 3/1999 | Hawkins et al. ............ 707/201 |
| 5,884,324 A | 3/1999 | Cheng et al. ................ 707/201 |
| 5,884,325 A | 3/1999 | Bauer et al. ................. 707/201 |
| 5,892,909 A | 4/1999 | Grasso et al. |
| 5,897,640 A | 4/1999 | Veghte et al. ............... 707/202 |
| 5,924,094 A | 7/1999 | Sutter |
| 5,926,816 A | 7/1999 | Bauer et al. ..................... 707/8 |
| 5,926,824 A * | 7/1999 | Hashimoto .................. 707/520 |
| 5,928,329 A | 7/1999 | Clark et al. |
| 5,943,676 A * | 8/1999 | Boothby ...................... 707/201 |
| 5,956,508 A | 9/1999 | Johnson et al. |
| 5,966,714 A | 10/1999 | Huang et al. |
| 5,974,238 A * | 10/1999 | Chase, Jr. .............. 395/200.78 |
| 5,995,980 A | 11/1999 | Olson et al. |
| 5,999,947 A | 12/1999 | Zollinger et al. |
| 6,098,078 A | 1/2000 | Gehani et al. |
| 6,081,806 A | 6/2000 | Chang et al. |
| 6,125,369 A | 9/2000 | Wu et al. |
| 6,141,664 A * | 10/2000 | Boothby ...................... 707/201 |
| 6,212,221 B1 | 4/2001 | Wakayama et al. |
| 6,216,131 B1 | 4/2001 | Liu et al. .................... 707/102 |
| 6,247,135 B1 | 6/2001 | Feague ....................... 713/400 |
| 6,272,074 B1 | 8/2001 | Winner |
| 6,330,568 B1 * | 12/2001 | Boothby et al. ............ 707/201 |
| 6,401,104 B1 * | 6/2002 | LaRue et al. ............... 707/203 |
| 2001/0014890 A1 * | 8/2001 | Liu et al. .................... 707/102 |

OTHER PUBLICATIONS

IntelliLink Brochure (1990).

"Logical Connectivity: Applications, Requirements, Architecture, and Research Agenda," Stuart Madnick & Y. Richard Wang, MIT, Systems Sciences, 1991 Hawaii Int'l, vol. 1, IEEE (Jun. 1991).

"Open Network Computing—Technical Overview," Sun Technical Report, Microsystems, Inc., pp. 1–32 (1987).

Organizer Link II Operation Manual, Sharp Electronics Corporation (No date).

"The Big Picture (Accessing Information on Remote Data Management System," UNIX Review, v. 7, n. 8, p. 38(7) (Aug. 1989).

User Manual for Connectivity Pack for the HP 95LX, Hewlett Packard Company (1991).

User Manual for PC–Link for the B.O.S.S. and the PC–Link for the B.O.S.S., Traveling Software, Inc. (1989).

Zahn et al., *Network Computing Architecture*, pp. 1–11; 19–31; 87x115; 117–133; 187–199; 201–209 (1990).

USSN 08/749,926, filed Nov. 13, 1996.

USSN 08/752,490, filed Nov. 13, 1996.

USSN 08/748,645, filed Nov. 13, 1996.

Alfieri, "The Best of WordPerfect Version 5.0," Hayden Books, pp. 153–165, 429–435 (1988).

"Automatically Synchronized Objects," Research Disclosure #29261, p. 614 (Aug. 1988).

Chapura, Inc., *PilotMirror Features Page*, http://www.chapura.com/features.html (1997).

Oracle 7™ Server SQL Manual Release 7.3, Feb. 1996.

Lomet, D., Using timestamping to optimize two phase commit; Parallel and Distributed Information Systems, 1993, Proceeding of the Second International Conference, Jan. 20–22, 1993: pp. 48–55.

Oracle 7 Distributed Database Technology and Symmetric Replication, Oracle White Paper, Apr. 1995.

Oracle 7™ Server SQL Manual Release 7.3, Feb. 1996.

Oracle 7™ Server SQL Manual Release 7.3, Feb. 1996.

Quaglia, F. et al., Grain Sensitive Event Scheduling in Time Warp Parallel Discrete Event Simulation, Fourteenth Workshop on Parallel Distributed Simulation, PADS 2000, May, 28–31, 2000: pp. 173–180.

Salzberg, B., Timestamping After Commit, Procs. Of the Third Int. Conf. On Parallel and Distributed Information Systems, Sep., 28–30, 1994: pp. 160–167.

Zhang et al., Impact of Workload and System Parameters on Next Generation Cluster Scheduling Mechanisms, IEEE Trans. On Parallel and Distributed Systems, vol. 12, No. 9, Sep. 2001: pp. 967–985.

IntelliLink for Windows User's Guide, Version 3.0, IntelliLink Corporation (1993).

Database Subsetting Tool: Introduction to DST and DST Designer's Guide, Syware, Inc. (1993).

Sarin, "Robust Application Design in Highly Available Distributed Databases," Proc. $5^{th}$ Symp. Reliability in Distributed Software and Database Systems, pp. 87–94 (Jan 13–15, 1986, Los Angeles).

Distributed Management of Replicated Data: Final Report, Computer Corporation of America (Oct. 9, 1984).

Sarin et al., "Overview of SHARD: A System for Highly Available Replicated Data", Computer Corporation of America (Apr. 8, 1988).

SRI Int'l, Network Reconstitution Protocol, RADC–TR–87–38, Final Technical Report (Jun. 1987).

Danberg, "A Database Subsetting Tool" (patent application) (Apr. 12, 1993).

Lamb et al., "The Objectstore Database System," Communications of the ACM, vol. 34, No. 10, pp. 50–63 (Oct. 1991).

TT Interchange, Time Technology, AVG Sales & Marketing Ltd. (1995).

Goldberg et al., "Using Collaborative Filtering to Weave an Information Tapestry," Communications of the ACM, vol. 35, No. 12, pp. 61–70 (Dec. 1992).

Now Up–to–Date Version 2.0 User's Guide, Now Software, Inc. (1992).

An Introduction to DataPropagator Relational Version 1, IBM Corporation (1993).

Data Propagator Relational Guide Release 1, IBM Corporation (May 1994).

DataPropagator Relational Guide Release 2, IBM Corporation (Dec. 1994).

DataPropagator NonRelational Guide MVS/ESA Version 2 Utilities Guide, IBM Corporation (Jul. 1994).

DPROPR Planning and Design Guide, IBM Corporation (Nov. 1996).

DataPropagator Relational Capture and Apply/400 Version 3, IBM Corporation (Jun. 1996).

DataPropagator Relational Capture and Apply for OS/400 Version 3, IBM Corporation (Nov. 1996).

Newton Connection Utilities User's Manual for the Macintosh Operating System, Apple Computer, Inc. (1996).

Newton Connection Utilities User's Manual for Windows, Apple Computer, Inc. (no date).

Newton Connection Utilities User's Manual for Macintosh, Apple Computer, Inc. (no date).

Newton Backup Utility User's Guide for the Windows Operating System, Apple Computer, Inc. (1995).

Newton Backup Utility User's Guide for the Macintosh Operating System, Apple Computer, Inc. (1995).

Newton Utilities User Manual, Apple Computer, Inc. (1995).

FileMaker Pro Server Administrator's Guide, Claris Corporation (1994).

Connectivity Pack User's Guide for the HP 200LX and the HP 100LX, Hewlett Packard (no date).

Lotus cc:Mail Release 2, Lotus Development Corporation (1991–1993).

User's Guide Lotus Organizer Release 1.0, Lotus Deelopment Corporation (1992).

FileMaker Pro User's Guide, Claris Corporation (1990, 1992).

Poesio et al., "Metric Constraints for Maintaining Appointments: Dates and Repeated Activities" (no date).

Slater, "Newton's Legacy; 3COM and Microsoft Battle for Market Share; Apple Newton, 3Com Palm III, Microsoft Palm–size PC personal digital assistant; Product Information", Information Access Company (1998).

Negrino, "ACT 2.5.1, ACT for Newton 1.0", UMI, Inc. (1996).

Zilber, "Toy story; personal digital assistants; Product Information", Information Access Company (1996).

Wingfield, "Desktop to Newton connectivity", UMI, Inc. (1996).

"Now Software Announces Updated Synchronization Software for Newton 2.0 Devices; Now Synchronize Simultaneously Updates MessagePad, Now Up–to–Date & Contact", Business Wire, Inc. (1995).

"Claris Ships FileMaker Pro 3.0 for Macintosh and Windows", Business Wire, Inc. (1995).

Alsop, "Distributed Thinking; Realizing the gravity of its PDA problems, Apple has drawn me back to Newton", InfoWorld Media Group (1995).

Rubin, "Now Software stays in sync; Now Synchronize file synchronization software for Macs and Newton PDAs; Software Review; EvaluationBrief Article", Information Access Company (1995).

"Now Calendar/Scheduler/Contact Mgr for Mac Update", Post–Newsweek Business Information Inc. (1995).

Staten, "csInStep middleware lets Newton talk to PIMs; Concierge Software LC's csInStep; Brief Article; Product Announcement; Brief Article", Information Access Company (1995).

Baum, "Designing Moble applications; A new approach needed for on–the–road systems", Info World Media Group (1994).

Parkinson, "Remote users get in sync with office files; News Analysis", Information Access Company (1994).

Adly, "HARP: A Hierarchical Asynchronous Replication Protocol for Massively Replicated Systems," Computer Laboratory, Cambridge University, United Kingdom (undated).

Adly et al., "A Hierarchical Asynchronous Replication Protocol for Large Scale Systems," Computer Laboratory, Cambridge University, United Kingdom, Computer Science Department, Alexandria University, Egypt (undated).

Alexander, "Designed, sold, delivered, serviced," Computerworld Client/Server Journal, pp. 43 (Oct. 01, 1995).

"All I need is a miracle; computer–aided educational packages; Small Wonders," Coastal Associates Publishing L.P. (Mar. 1992).

Alonso et al., "Database System Issues in Nomadic Computing," Matsushita Information Technology Laboratory, New Jersey (undated).

Badrinath et al., "Impact of Mobility on Distributed Computations," Operating Systems Review (Apr. 1, 1993).

Barbara et al., "Sleeper and Workaholics: Caching Strategies in Mobile Environments (Extended Version)" (Aug. 29, 1994).

Bowen, M. et al., Achieving Throughput and Functionality in a Common Architecture: The Datacycle Experiment, *IEEE*, pp. 178, 1991.

Brandel, "New offerings fuel revival of PIM," Computerworld, p. 39 (Sep. 12, 1994).

Broderson, "InfoPad–An Experiment in System Level Design and Intregration," (Mar. 01, 1997).

Demers et al., "The Bayou Architecture: Support for Data Sharing Among Mobile Users," Computer Science Laboratory, Xerox Palo Alto Research Center, California (undated).

DeVoe et al., "SOFTWARE: Day–Timer Organizer 2.0 based on format of paper–based PIM," InfoWorld, vol. 17 (Aug. 21, 1995).

Froese, "File System Support for Weakly Connected Operation," pp. 229–238 (undated).

Greenberg et al., "Real Time Groupware as a Distributed System: Concurrency Control and its Effect on the interface," Procs. Of the ACM CSCW Conf. On Computer Supported Cooperative Work, Oct. 22–26, North Carolina, ACM Press (Jan. 01, 1994).

Guy, "Ficus: A Very Large Scale Reliable Distributed File System," Technical Report CSD–910018, Computer Science Dept. UCLA (Technical Report) (Jun. 03, 1991).

Guy et al., "Implementation of the Ficus Replicated File System, " appeared in Procs. Of the Summer USENIX Conf., Anaheim, CA, pp. 63–71 (Jun. 01, 1990).

Haber, "Renegade PIMS," Computerworld, p. 109 (Dec. 12, 1994).

Hammer et al., "An Approach to Resolving Semantic Heterogeneity in a Federation of Autonomous, Heterogeneous Database Systems," Computer Science Department, University of Southern California (undated).

Hammer et al., "Object Discovery and Unification in Federated Database Systems," University of Southern California (undated).

HP and IntelliLink connect HP 95LX with HP NewWave; IntelliLink for the HP NewWave; product announcement, HP Professional (Aug. 1991).

"HP announces expanded memory version of palmtop PC, introduces 1–Megabyte HP 95LX and 1–Megabyte memory cards," Business Wire, Inc. (Mar. 4, 1992).

Huston et al., "Disconnected Operation of AFS," CITI Technical Report 93–3, Center for Information Technology Integration, Univerisity of Michigan (Jun. 18, 1993).

IBM Dictionary of Computing, Tenth Edition, 1993, pp. 268, 269, 31 _.

IBM Dictionary of Computing, Tenth Edition, 1993, pp. 165, 268, 349, 370, 417.

IEEE Standard Dictionary of Electrical and Electronics Terms, Fourth Edition, 1988, p. 372, 368, 509, 563.

Imielinski, "Mobile Computing —DataMan Project Perspective," Rutgers Universtiy (undated) .

Informix, Informix Guide to SQL: Tutorial; Version 7.1, 1994.

"IntelliLink 2.2: the software connection from desktop to palmtop; Software Review; IntelliLink 2.2; Evalution," PC Magazine (Apr. 28, 1992).

"IntelliLink transfers palmtop, PC data; communcaitions software from IntelliLink Inc; brief article; Product Announcement," PC Week (Nov. 18, 1991).

Jacobs et al., "A Generalized Query–by–Example Data Manipulation Language Based on Database Logic," IEEE Transactions on Software Engineering, vol. SE–9, No. 1 (Jan. 1993).

Jenkins, "Users Struggle with E–mail Woes," Computerworld, p. 97 (Oct. 24, 1994).

Johnson et al., "Hierarchical Matrix Timestamps for Scalable Update Propagation," submitted to the $10^{th}$ Int. Workshop on Distributed Algorithms (Jun. 25, 1996).

Joshi et al., "A Survey of Mobile Computing Technologies and Applications," (Oct. 29, 1995).

Kistler et al., "Disconnected Operation in the Coda File System," School of Computer Science, Carnegie Melon University, Pennsylvania (undated).

Krill, "Networking: Tech Update," InfoWorld, vol. 18 (Feb. 12, 1996).

Kumar et al., "Log–Based Directory Resolution in the Coda File System, " School of Computer Science, Carnegie Melon University, Pennsylvania (undated).

Larson et al., "Theory of Attribute Equivalence in Databases with Application to Schema Integration," IEEE Transactions on Software Engineering, vol. 15, No. 4, Apr. 1989.

Mannino et al., "Matching Techniques in Global Schema Design," IEEE 1984.

Marshall, "Product Reviews: Windows contact managers," InfoWorld, vol. 18 (Mar. 25, 1996).

McGoveran, "Distributed not yet delivered," Computerworld, p. 112 (Jun. 6, 1994).

Meckler Corporation, "Palmtop–to–desktop linkage software," Database Searcher (Jun. 1992).

Microsoft Press Computer Dictionary, Second Edition, 1994, p. 164.

Microsoft Press Computer Dictionary, Second Edition, 1994, pp. 105, 217, 227, 228.

Microsoft Press Computer Dictionary, Third Edition, 1997, pp. 194, 228, 234, 449.

Milliken, "Resource Coordination Objects: A State Distribution Mechanism," (DRAFT) (Dec. 10, 1993).

Nash, "Replication falls Short," Compter world, p. 65 (Nov. 21, 1994).

Noble et al., "A Research Status Report for Adaptation for Mobile Data Access," School of Computer Science, Carnegie Melon University (undated).

Oracle7 Server Distributed Systems, Vol. II: Replicated Data, Release 7.3 (Feb. 1996).

"PackRat PIM gets older and wiser with Release 4.0; PIM update sports enhanced interface, greater ease of use," InfoWorld (Dec. 23, 1991).

"Palmtop PCs: power by the ounce; Hardware Review; overview of six evaluations of palm–top computers; includes related articles on Editor's Choices, suitability–to–task ratings, impressions by individual users; evaluation," PC Magazine (Jul. 1991).

"Pen–based PCs ready for prime time; includes related article on comparison of operating systems, list of vendors of pen–based products," PC–Computing (Nov. 1991).

Perera, "Synchronization Schizophrenia," Computerworld Client/Server Journal, p. 50 (Oct. 1, 1995).

Petersen et al., "Bayou: Replicated Database Services for World–wide Applications," Computer Science Laboratory, Xerox Palo Alto Research Center, California (undated).

"Product comparsion: Atari Portfolio, Casio Executive BOSS, HP 95LX, Poqet PC, Psion series 3, sharp Wizard," InfoWorld (Dec. 16, 1991).

"Product Comparison: Personal information managers," InfoWorld, vol. 17 (Aug. 07, 1995).

Qu et al., Technical Report entitled "Mobile File Filtering," TR–CS–97–02–Australian National University (Feb. 1, 1997).

Radosevich, "Replication mania," Computerworld Client/Server Journal, p. 53 (Oct. 1, 1995).

Ratner et al., "The Ward Model: A Replication Architecture for Mobile Environments," Department of Computer Science, University of California (undated).

Reiher et al., "Peer–to–Peer Reconciliation Based Replication for Mobile Computers," UCLA (undated).

Reiher et al., "Resolving File Conflicts in the Ficus File System," Department of Computer Science, University of California (undated).

Ricciuti, "Object database server," InfoWorld, vol. 18 (Jan. 29, 1996).

"Riding the NewWave from PC to Palmtop: IntelliLink lets NewWave users transfer files," InfoWorld (Jun. 3, 1991).

Saltor et al., "Suitability of data models as canonical models for federated databases," Universitat Politecnica de Catalunya, Spain (undated).

Satyanarayanan, "Coda: A Highly Available File System for a Distributed Workstation Environment, " School of Computer Science, Carnegie Mellon University (undated).

Satyanarayanan, "Fundamental Challenges in Mobile Computing," School of Computer Science, Carnegie Mellon University (undated).

Satyanarayanan, "Mobile Information Access," IEEE Personal Communications, vol. 3, No. 1 (Feb. 1996).

Sherman, "Information Technology: 'What Software Should I Use to Organize My Life'," (undated).

Sheth et al., "A Tool for Integrating Conceptual Schemas and User Views," IEEE 1988.

Schilit et al., "The ParcTab Mobile Computing System," Xerox Palo Alto Research Center, California (undated).

SPI Database Software Technologies Record Displays: Record 2, Ser. No. TDB0291.0094 and Record 4, Ser. No. iets0901.0073 (undated).

Staten, "PowerMerge 2.0 ships; syncs moved filed," MacWeek, vol. 8, p. 38(1) (Jan. 3, 1994).

Tait, Doctoral Thesis entitled "A File System for Mobile Computing," (Jan. 1, 1993).

Tolly, "Enhanced Notes 4.0 gets thumbs–up, " Computerworld, p. 54 (Dec. 18, 1995).

Webster's Ninth New Collegiate Dictionary, 1986, pp. 114, 436, 440, 462, 573, 597, 620, 717, 906, 963, 979, 989, 1000, 1053, 1130, 1142, 1152, 1162, 1166,.

Wiederhold, Gio, Database Design, Second Edition, McGraw–Hill Book Company, 1983, p. 2.

Wiederhold, Gio, and Qian Xiaolei, Consistency Control of Replicated Data In Federal Database, *IEEE,* pp. 130–132. 1990.

Zaino, "Tapping the Top Values in PDAs —Personal digital assistants that sell for as little as $300 can put a PC in the palm of your hand. Get the scoop on 8 contenders," HomePC, pp. 97 (Oct. 1, 1996).

Zisman et al., "Towards Inoperability in Heterogenous Database Systems," Imperial College Research Report No. DOC 95/11 (Dec. 1, 1995).

\* cited by examiner (1 Microfiche, 95 Pages)

TRANSFERRING RECORDS BETWEEN TWO DATABASES

An appendix (appearing now in paper format to be replaced later in microfiche format) forms part of this application. The appendix, which includes a source code listing relating to an embodiment of the invention, includes 95 frames on 1 microfiche.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

BACKGROUND

This invention relates to transferring records between incompatible databases.

Databases are collections of data entries which are organized, stored, and manipulated in a manner specified by applications known as database managers (hereinafter, the term "database" also refers to a database manager combined with a database proper). The manner in which database entries or records are organized in a database is known as the record structure of the database. Fields and records of a database may have many different characteristics depending on the database's purpose-and utility.

Databases can be said to be incompatible with one another when the data structure (or record structure) of one is not the same as the data structure (or record structure) of another, even though some of the content of the records is substantially the same. For example, one database may store names and addresses in the following fields: FIRST_NAME, LAST_NAME, and ADDRESS. Another database may, however, store the same information with the following structure: NAME, STREET_NO., STREET_NAME, CITY_STATE, and ZIP. Although the content of the records is intended to contain the same kind of information, the organization of that information is completely different.

Often users of incompatible databases want to be able to transfer records from one database to another incompatible database to populate the incompatible database with new records or to synchronize the two databases with one another. To do so, typically, a field map is used which is a set of relationships or correlations between the fields of the two databases to one another. Various types of data structures can be used to represent a field map in computer memory. Field mapping is generally described in the commonly assigned U.S. Pat. No. 5,392,390, incorporated herein by reference.

SUMMARY

In a first aspect, in order to for example transfer data between two databases, a computer program automatically establishes a field map between the record structures of the two databases using information identifying the record structure of one of the databases. The field map is established automatically by correlating a first plurality of the fields of the first database to a second plurality of the fields of the second database. The data stored in the first plurality of fields of a plurality of the records of the first database is then translated in accordance with the field map.

Embodiments of this aspect of the invention have the advantage that a computer program does not use a predetermined field map and requires little or no input from the user for establishing the field map.

In a second aspect, prior to transmitting data between two databases during a data transfer session, information identifying the record structure of the one of the first and second databases is transmitted to a computer program and, based on that information, a data transfer protocol is established. Data stored in a plurality of fields of a plurality of the records of the first database is then transmitted, according to the database transfer protocol, from the first database to the second database.

Embodiments of this aspect of the invention may include the following advantages. By transmitting the identifying information prior to transmitting the data, the specifics of the data transfer session can be established in the data transfer protocol. In this manner, the efficiency of the data transfer session is increased, for example, by limiting the number of transmitted fields or by limiting the transmitted records to only those which meet a search criteria.

In a third aspect, in order to transmit data between two databases, information identifying the record structure of one of the two databases is transmitted to a computer program. This transmitted information identifies both the categories and the properties of a plurality of fields of the record structure of one of the two databases. Data stored in a plurality of fields of a plurality of the records of the first database is then transmitted from one of the two databases to the other one of the two databases. The transmitted data is then processed using the identifying information.

Embodiments of this aspect of the invention, by providing both the categories and properties of the fields, can provide a better picture of the data structure of a database to a computer program. Therefore, the computer program can more accurately process the data transmitted from the database. For example, the computer program can more accurately translate the records of the database to a form compatible with the record structure of another database.

Preferred embodiments of the invention may include one or more of the following features.

Data stored in the plurality of fields of the plurality of the records of the first database is transmitted to the second database. The data may be translated before the data is transmitted or may be translated after the data is received at its destination. The transmitted data may be stored in the second database or at least one record of the second database may be synchronized with the transmitted data. Additionally, the first database may be stored on a first computer and the second database on a second computer. In that case, the data is transmitted from the first computer to the second computer.

All or part of the fields in the data structure of the first computer is mapped onto all or part of the fields in the structure of the second computer.

The information identifying the record structure of one of the first and second databases identifies the record structure according to a selected protocol, where the selected protocol provides a syntax for identifying the characteristics of a field of that databases.

The identifying information identifies categories of the fields in the record structure of the one of the first and second databases according to the selected protocol and the fields of the first database are correlated to the fields of the second database based on the identified categories of the fields. The categories of the fields in the record structure of the one of the first and second databases can be classified into a plurality of mapping classes and the fields of the first database are correlated to the second plurality of the fields of the second database based on the plurality of mapping classes. Mapping rules are applied to the plurality of mapping classes to correlate the fields. One of the mapping rules can indicate that fields of the one of the databases having a selected class, if absent in the other one of the databases, are to be mapped to fields having a selected class.

The fields of the first and second databases are further characterized by having selected properties and the identifying information identifies the selected properties of the fields of one of the first and second databases according to the selected protocol. During translation, the data in the fields is then modified based on the identified properties.

The identifying information can be transmitted to a computer program where the computer program correlates the fields of the first and second databases to establish the field map. The transmitted information may be in a format according to a selected protocol and then be converted into the identifying information.

Establishing the data transfer protocol can include correlating the fields of the first database to the fields of the second database to establish a field map, using information identifying the record structure of one of the first and second databases. Establishing the data transfer protocol can also include determining a plurality of fields of the first database to be transmitted based on the plurality of the fields of the first database which were mapped, where the plurality of fields to be transmitted can be less than all of the fields of the records of the first database. Establishing the data transfer protocol can also include determining a plurality of records of the first database to be transmitted based on a selected criterion, where the selected criterion includes a criterion for searching a first database and selecting records matching the selected criterion.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description of preferred embodiments, including the drawings, and from the claims.

DESCRIPTION

We will describe various embodiments of computer programs and systems for transferring records between a database stored on a remote computer and an incompatible database stored on a host computer in detail below. It should be noted that the term "computer" as used here includes any device being capable of manipulating electronic data and typically having a processor and memory. Such a device can be, but is not limited to, a hand held computer, a personal digital assistant, and a personal computers such as a desktop computer or a notebook computer. Such a device can also be an electronic device having some "intelligence" or processing capability, such as an "intelligent" paging device or cellular telephone. It should also be noted we will use the terms "host" and "remote" for conveniently differentiating between the components of a first computer and a second computer and the programs running on the first and second computers. The first and second computers may be in any other type of relationship such as peer to peer, client/server, etc.

Briefly, in some embodiments described here, at the time of a data transfer session between the remote and host computers, the fields of the records of the remote database are dynamically and automatically mapped to the fields of the records of the host database. The fields are dynamically mapped in that a computer program generates a field map without having any previous information as to the data structure of at least one of the databases. This information is provided during the data transfer session. The fields are automatically mapped in that a computer program generates a field map during the data transfer session based on a set of predetermined criteria. The computer program does not use a predetermined field map and requires little or no input from the user for generating the field map. The map is then used to translate records of the remote database into a format compatible with the data structure of the host database.

To enable such dynamic and automatic mapping, in some embodiments, the remote computer sends the host computer a record structure data packet. The record structure data packet, based on a predefined field identification protocol, identifies the characteristics of the record structure of the remote database to the host computer. The host computer then uses that information to generate a field map for the two databases.

Figure 1:
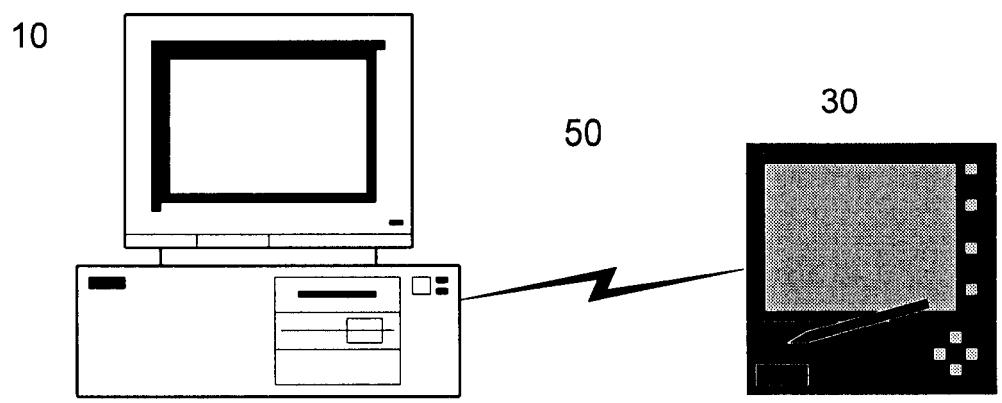
FIG. 1 shows a remote computer and a host computer connected via a data transfer link.
Figure 2:
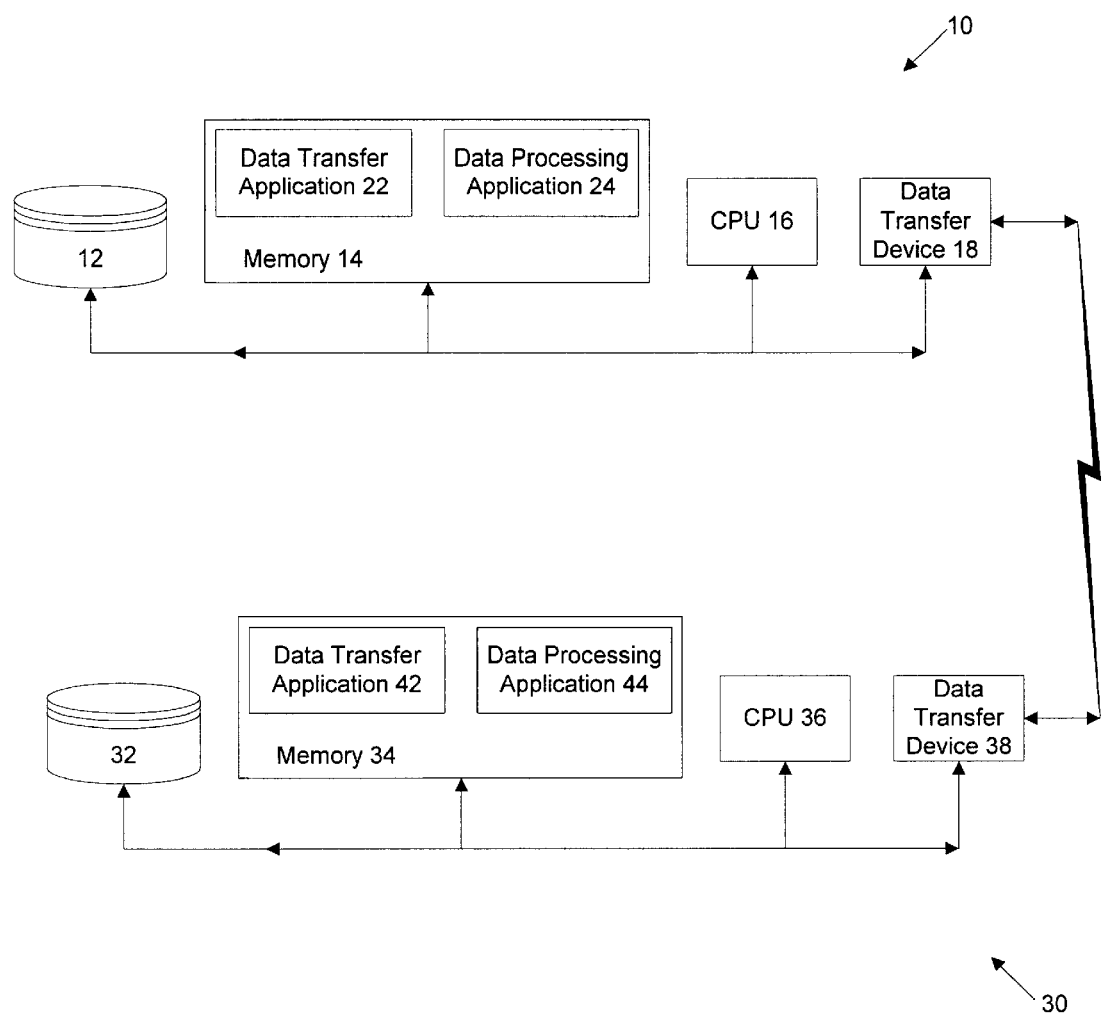
FIG. 2 shows a schematic diagram of the components of the remote and host computers of FIG. 1.

We will now describe an example of a computer system which may execute various embodiments of the programs described here for transferring data between two databases. Referring to FIGS. 1 and 2, a host computer 10 and a remote computer 30 are connected via a data transfer link 50. Data transfer link 50 may be implemented by a data transfer medium and data transfer devices 28, 38 in each of the host and remote computers using that data transfer medium. Data transfer devices 28 and 38 may be, for example, standard network interfaces, infra red ports, or telephone modems. The data transfer medium may in turn be a data communication network, infra red signals, or telephone lines.

Each of the host and remote computers 10, 30 includes a long term storage device storing a database (respectively, referred to as host database 32 and remote database 34), which may be a database of a personal information manager (PIM) application. Each of the host and remote computers 10, 30 further includes a memory 14, 34 and a central processing unit (CPU) 16, 36. Each of the memory 14, 34 stores at least two types of computer software programs (which may be stored on a long term storage medium and loaded into memory 14, 34): host and remote data transfer programs 22, 42 for transferring records between the host and remote computers 10, 30 and host and remote data processing programs 24, 44 for processing the transferred records by, for example, populating or synchronizing the records of the database stored in the long term storage with the transferred records. It should be noted that data transfer programs 22, 42 typically constitute a module in either data processing programs 24, 44 or databases 12, 32.

Host and remote databases 12, 32 each has a record structure specifying the organization of the data in each of the records of the database. Each record typically includes a number of fields. In order to facilitate communicating the record structure of these databases between remote computer 30 and host computer 10, data transfer programs 22, 42 use a field identification protocol. A field identification protocol provides a syntax for identifying and communicating characteristics of a field of a database. It provides two types of information: information identifying a "category" for the field and information identifying a "property" of a field.

The category of a field defines the type of information the field is designed or meant to contain. Databases are generally designed to store data for a particular application, for example, airline reservations, medical records, etc. In the case of personal information manager (PIM) applications, several types of databases are typically used, where the type of a database corresponds to the type of data stored in the database: appointments, "to do" lists, address books, expense records, general notes records, and e-mails. For these types of databases, a field identification protocol preferably provides a comprehensive list of field categories such that the fields of most, if not all, of commercially available PIM databases can be categorized according to the categories in the field identification protocol. (The same can also be done for other types of databases.) For example, in the case of an address book type database, the categories may include: name, last name, first name, middle initial, address, street name, city, state, home telephone number, business telephone number, etc. Then, for example, the record structure of remote database 32 may include a field that is of the category "name". The record structure of host database 12 may include equivalent fields of the categories "last name," "first name," and "middle initial," but not necessarily a field of the category "name". In other embodiments, the field identification protocol provides a list of field categories for a selected group of databases or for those databases designed to conform to the protocol.

The property of a field indicates the limits or rules imposed on the manner in which data is stored in that field. The property of a field is in addition to the category of that field and is typically database specific. The property of a field can be the number of bytes used to store the data in that field. The property of a field can also include one or more rules governing the permissible content of the data, such as one or more rules from the following exemplary list of rules:

rules on the permissible format in which the data is stored; for example, for a date field, a rule may specify whether the date is stored in the year/month/day or month/day/year format or, for a text field, a rule may specify whether a text field stored in ASCII with end of line markers or in ASCII without end of line markers;

rules on the permissible range of data; for example, for a "to do" list priority field, the range of data may be limited to the numbers between one and three;

rules on the permissible maximum allowable size of a field, for example, a text field may be limited to 500 characters.

These rules are also discussed in the following U.S. patent applications of the assignee hereof, incorporated in by reference herein: "Synchronization of Recurring Records in Incompatible Databases", Ser. No. 08/752,490, filed on Nov. 13, 1996 (hereinafter, "'490 application"), currently U.S. Pat. No. 5,943,676, issued Aug. 24, 1999, "Synchronization of Databases with Record Sanitizing and Intelligent Comparison," Ser. No. 08/749,926, filed Nov. 13, 1996 (hereinafter, "'926 application"), now abandoned "Synchronization of Databases with Date Range," Ser. No. 08/748,645, filed Nov. 13, 1996 (hereinafter, "'645 application"), now U.S. Pat. No. 6,141,664, issued on Oct. 31, 2000. In the '490, '926, and '645 applications, examples of these rules are referred to as rules of data value.

As mentioned, a field identification protocol provides a syntax for remote and host data transfer programs 22, 42 to communicate with one another the data structure of their respective databases. Such a syntax includes, for example, assigning to each field category a designation (for example, a numerical, alphabetical, or alphanumerical code or name) identifying that field category, such as "Addr" for address, "Tell" for the first telephone number, "Appt:date" for a date field of an appointment type record. The syntax also includes a manner of communicating the possible properties of the various fields, for example, by using designations (for example, a numerical, alphabetical, or alphanumerical code or name) identifying a type of property, such as "field_size" for designating the number of bytes in a field, "ApptDate_format" for designating a format of a date field, "value_range" for designating the range of permissible values, or "maximum_text_size" for designating the maximum number of the characters in a text field.

Generally, a record structure of a database can be mapped to a record structure of another database based on the categories of the fields of the databases, as will be described below. However, in some circumstances, the properties of the fields can affect the accuracy of the mapping. For example, the content of a field or the number of bytes representing a field may have to be modified during translating the field according to the map so that a field fits the record structure of the other database. (This process is described as "sanitization" in the '490, '926, and '645 applications.) Therefore, the records of the two databases can be more accurately mapped and translated if both the categories and the properties of the fields of the databases are known.

Figure 3:
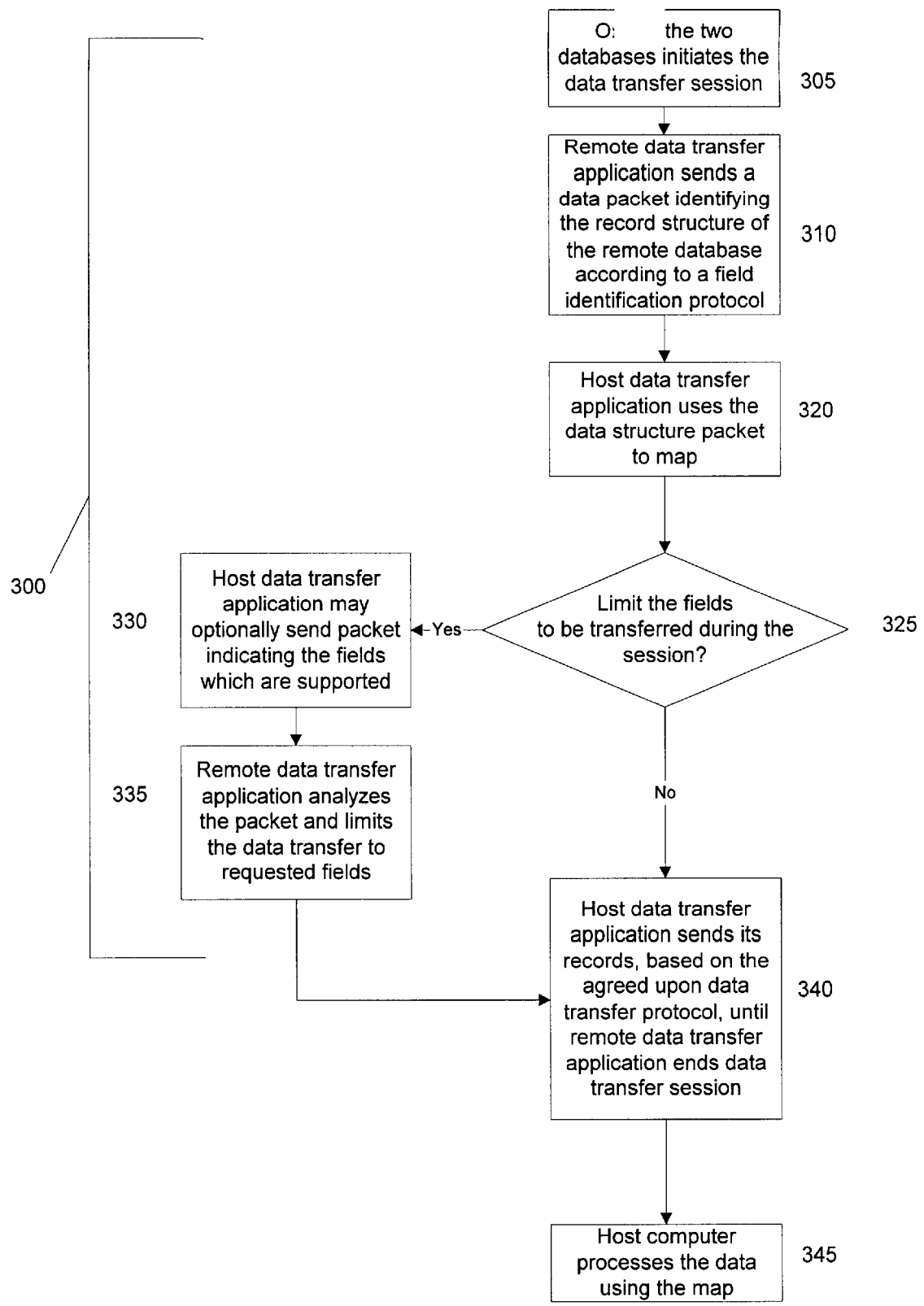
FIG. 3 is a flow chart of a computer implemented method of transferring data.

Referring to FIG. 3, we will now describe in detail how data transfer programs 22, 42 use field identification protocols for generating a field map and transfer the records of remote database 32 to host computer 10. We will then describe how data processing programs 24, 44 process the transferred records.

Referring to FIG. 3, steps 305–335 together constitute a data transfer protocol agreement segment 300. In these steps, host and remote data transfer programs 22, 42 communicate with one another and agree to a data transfer protocol to be used for the rest of the data transfer session.

The data transfer protocol delineates the specifics of how the data is to be transferred between the two computers. The data transfer protocol may delineate, for example, that only some of the fields of the records are to be transferred, that the remote database translate the records to the records of the host database prior to transmitting the records to the host database, or that only those records fitting a particular criteria, such as a database search criteria, are to be transferred.

To begin the data transfer session, one of the remote or host computers 10, 20 initiates a data transfer session (step 305). Remote data transfer program 42 then sends a record structure data packet including information identifying the record structure of remote database 32 to host computer 10 (step 310). To identify the record structure of the remote database to the host database, remote data transfer program 42 uses a field identification protocol, which we will refer to as the "external field identification protocol". Using the external field identification protocol, remote data transfer program 42 constructs the record structure data packet to include the appropriate information and codes which identify the categories and properties of the fields of the records of remote database 32. In some embodiments, only the categories of the fields are identified.

Host data transfer program 22 uses the record structure packet from remote data transfer program 42 to automatically map the records of remote database 12 to the records of host database (step 320).

We will describe the automatic mapping process in detail below in reference to FIG. 4. However, briefly, host data transfer program 22 uses a series of automatic field mapping rules to correlate the fields in the record structure of remote database 32 to the fields in the record structure of host database 12. Hence, host data transfer program 22 develops a field map for mapping the records of the remote database to the records of the host database.

Figure 4:
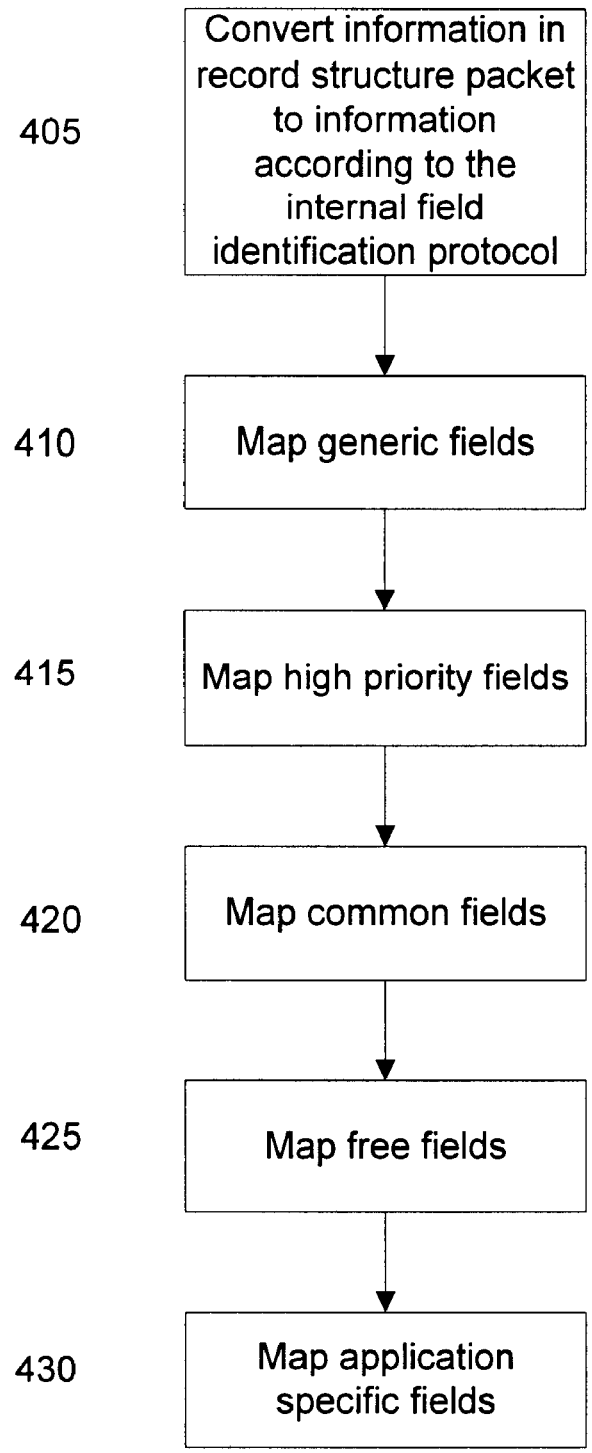
FIG. 4 is a flow chart of a computer implemented method of automatically mapping record structures of two databases.

Referring to FIG. 4, host data transfer program 22 uses an internal field identification protocol which may be different from the external field identification protocol. Therefore, host data transfer program 22 first converts the information in the record structure packet received from remote data transfer program 42 into a format in accordance with its internal field identification protocol (step 405). This allows host data transfer program 22 to be able to receive data structure packets based on any number of external field identification protocols and support those packets by merely converting them into its own internal field identification protocol.

In steps 410–430, host data transfer program 22, automatically correlates the fields of the records of the remote database to the fields of the records of the host database to develop a field map. We will now describe an exemplary method used by host data transfer program 22. In this exemplary method, the internal field identification protocol not only provides a manner for classifying fields based on the categories and properties, but also divides the field categories into, for example, five field classes for automatic mapping: generic, high priority, common, free, and application specific fields.

The first class designates the field categories which are present in the record structure of most, if not all, databases of a specific type (e.g. address book database). In other words, the first class designates fields that are "generic" for the type of database being mapped. For example, for an address book type database, such fields would include name, address, and telephone. According to the automatic mapping rules, host data transfer program 22 maps generic fields of one database to the generic fields of the other database (step 410). In some cases, a group of fields in one database contain the same information as a single field in another database. For example, one database may have a "name" field while the other database may have separate "first name", "middle initial", and "last name" fields. In that case, the group of fields is mapped to the single field.

Other four classes designate field categories which are not generic to the type of database being mapped. According to the automatic mapping rules, these other fields are mapped in a pre-specified order of priority, if there are suitable fields in the other database for them. The first of these non-generic classes are the fields that are designated to have high priority for mapping. Host data transfer program 22 maps these fields first and maps them to an unmapped field of the other database (step 415). The second non-generic class designates the common fields which are the fields which most commonly are present in the type of database being mapped but it is not uncommon for a database of this type not to contain them. For example, in the case of address book databases, most, but not all, databases have fields for notes or for a second set of address and telephone number. According to the automatic mapping rules, host data transfer program 22 maps common fields of the remote database to the common fields and, based on user preferences, free fields (for the third non-generic class, described below) of the host database based on their category and properly designation (step 420).

The third non-generic class designates free fields and the fourth non-generic class designates database specific fields. Free fields are those fields which do not fall into any of the previous classes. Host data transfer program 22 maps high priority fields to the free fields and, based on user preferences, common fields of the other database (step 425). Database specific fields are those fields which are unique to a database and are typically not supported by another database. They are therefore not mapped. In this case, in some embodiments, the user maps the database specific field. At the end of this process, the data structures of the remote and host databases are mapped onto one another.

As stated above, another aspect of mapping is using the field property information to determine whether the received data needs to be modified for proper translation. To determine what modification is necessary, the properties of the field of the remote database and the mapped field or fields of host database 12 are compared. It is then determined what changes are necessary to make the remote database records to conform to the properties of the fields of the host database records. For example, if a field in the remote database is a four-byte field and it is mapped onto a two-byte field, then the field needs to be trimmed. (Similar data modifications may also be performed on host database records to conform them to remote database records when sending the host database records to the remote database, for example, at the end of synchronization.)

Referring back to FIG. 3, after automatically mapping remote database 32 to host database 12 (step 320), data transfer program 22 then determines whether the number of fields of the records to be transferred should be limited (step 325). It may be the case that some of the fields of remote database 32 were not mapped to the fields of host database 12, for example, because host database 12 does not support as many fields or some particular types of fields. In that case, if remote database 32 and data transfer program 42 support such a limited data transfer, host data transfer program 22 sends a packet identifying the particular fields to be sent (step 330). Remote data transfer program 42 analyzes the received packet and limits the future data transfer to those records (step 335). At this point, host and remote data transfer have agreed to a data transfer protocol establishing the number of fields to be transferred and the map to be used.

The data transfer protocol may also contain other features. For example, as mentioned above, in some embodiments, host data transfer program 22 may also request that the remote database to translate the remote database records using the map developed in step 320 before transmitting the records. In some embodiments, host data transfer program 22 may request that remote data transfer program 42 transmit only those records fitting a particular search criteria, specified based on the database record structure received from remote data transfer program 42.

As it is readily apparent, establishing a data transfer protocol at the beginning of the session provides a variety of advantages. Host database transfer program 22 can develop a field map which can be used throughout the data transfer session. Additionally, the map can be sent to remote data transfer program 42 for translating the records prior to transmitting them. Moreover, host and remote database transfer programs 22, 42 can limit the amount of data transferred during the session by remote data transfer program 42 by limiting the number of transmitted fields or by limiting the transmitted records to only those which meet a search criteria.

After agreeing to a data transfer protocol for the duration of the data transfer session, remote data transfer program then sends the data contained in the records of remote database 32, based on the agreed upon data transfer protocol (step 340). Host computer then processes the received data, as will be described below in reference to FIGS. 5A and 5B.

Figure 5A:
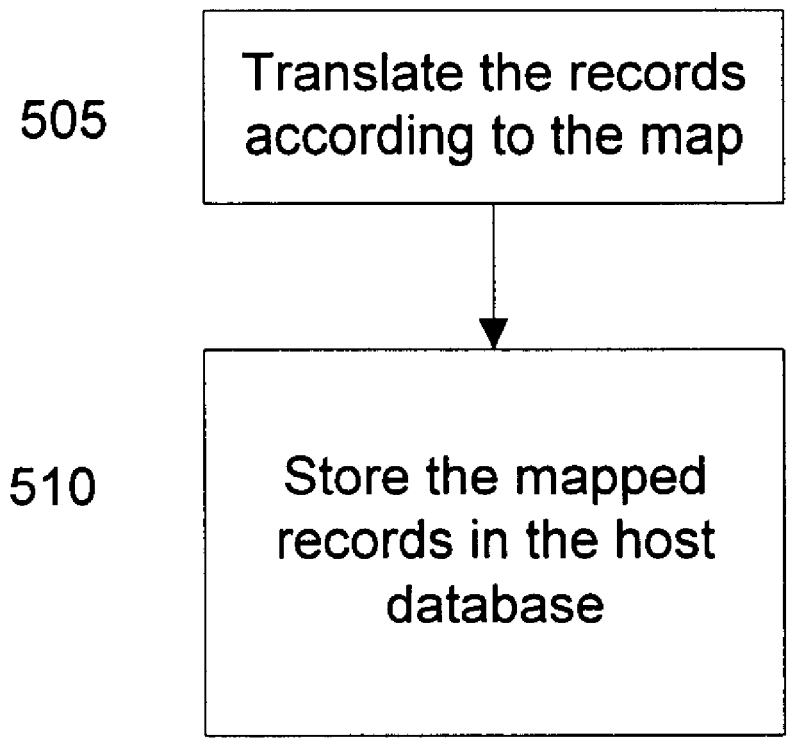
FIGS. 5A and 5B are flows charts of computer implemented methods of processing data transferred between the host and remote computers.
Figure 5B:
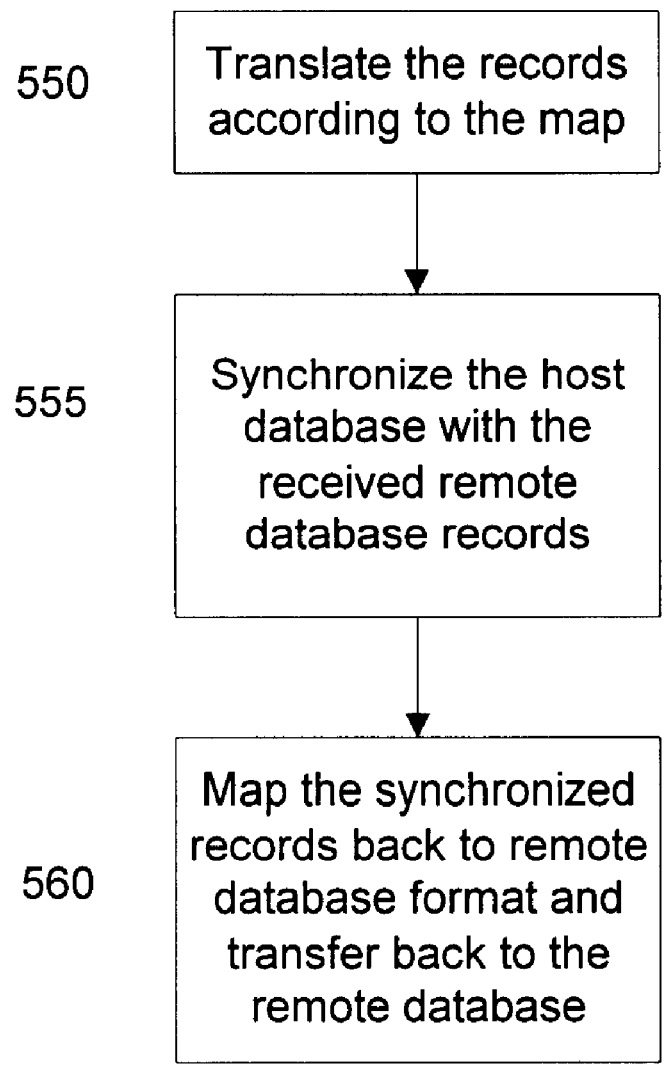

Referring to FIGS. 5A and 5B, after receiving the data from remote database 32, data processing program 24 processes the received records of remote database 32. In some embodiments, data processing program 24 simply populates the first database with new records corresponding to the received records. Referring to FIG. 5A, data processing program 24 uses the previously developed map to translate the received fields of remote database 32 (step 505). Data processing program 24 then stores the mapped fields as new records in host database 12, thereby populating the host database with the received records of the first database (step 510).

In other embodiments, host data processing program 24 synchronizes the records of host database 12 with the received records of remote database 32 (or those fields which were received). Referring to FIG. 5B, as in step 505 in FIG. 5A, data processing program 24 uses the previously developed map to translate the received fields of remote database 32 (step 550). Data processing program 24 then proceeds to synchronize host database 12 with the received records of remote database 32. Host data processing program can, for example, use methods of synchronization described in the '490, '926, and '645 applications; U.S. patents of the assignee hereof, Puma Technology, Inc. of San Jose, Calif., incorporated by reference herein: U.S. Pat. No. 5,392,390 and U.S. Pat. No. 5,684,990; and U.S. patent applications of the assignee hereof, incorporated in by reference herein: "Synchronization of Databases," filed on Nov. 5, 1997, Ser. No. 08/964,751 (hereinafter, the "'751 application"); "Distributed Synchronization of Databases", filed on Sep. 11, 1997, Ser. No. 08/927,922 (hereinafter, the "'922 application"), now U.S. Pat. No. 6,044,381, issued on Mar. 28, 2000; "Synchronization of Databases Using Filters," by David Morgan and David Boothby, filed on Mar. 5, 1998, Ser. No. 09/036,400, (hereinafter, the "filter application"), now U.S. Pat. No. 6,212,529, issued on Apr. 3, 2001. Briefly, host data processing program 24 synchronizes the records of the host and remote databases using a history file that contains records representative of the records of the two databases at the end of a previous synchronization. Host data processing program 24 uses the history file to determine, for example, which records have been changed, added or deleted since the previous synchronization and which records of the two databases correspond to one another. Host data processing program 24 can also synchronize the two programs without using a history file where, for example, a history file is not available or can not be used. Additionally, remote data processing program 44 can perform some data processing to enable distributed synchronization where a portion of the synchronization process is performed on remote computer 30, as described the '751, '922, and filter applications.

After synchronization, host data transfer program 24 translates back those remote database records which need to be updated as a result of synchronization (step 560). Host data transfer program 24 then transmits those records to remote database 32.

Other embodiments are within the scope of the following claims.

For example, remote data transfer program 42 can develop a map based on a record structure data packet from host data transfer program 22. Remote data transfer program 42 can then automatically map the two databases and then use the map to translate the records before transmitting them to the host data transfer program 22.

In other embodiments, instead of agreeing to data transfer protocol at the beginning of a data transfer, the field category and property information may be send with each record and then processed by the other computer.

In some embodiments, the host and remote databases, and all relevant programs described here, are stored on a single computer and the processing and transferring of data is performed on the same computer. In other embodiments, a field identification protocol supporting only field categories is used.

What is claimed is:

1. A computer implemented method of transferring data between a first database and a second database storing records of data, the first database being characterized by a first record structure determining fields of the records of the first database, and the second database being characterized by a second record structure determining fields of the records of the second database, the method comprising the steps of:

establishing a field map relating the fields of the first and second databases, substantially without user input, by correlating a first plurality of the fields of the first database to a second plurality of the fields of the second database using information identifying the record structure of at least one of the first and second databases, and translating the data stored in the first plurality of fields of a plurality of the records of the first database in accordance with the field map, wherein the identifying information identifies the record structure according to a selected protocol, and wherein the selected protocol provides a syntax for identifying the characteristics of a field of the one of the first and second databases.

2. The method of claim 1 further comprising transmitting from the first database to the second database data stored in the plurality of fields of the plurality of the records of the first database.

3. The method of claim 2 wherein the data is translated before the data is transmitted.

4. The method of claim 2 further comprising storing the transmitted data in the second database.

5. The method of claim 2 further comprising synchronizing at least one record of the second database with the transmitted data.

6. The method of claim 1 wherein the first database is stored on a first computer and the second database is stored on a second computer.

7. The method of claim 1 wherein the first plurality of the records of the first database includes all of the records of the first database.

8. The method of claim 1 wherein the identifying information identifies categories of the fields in the record structure of the one of the first and second databases according to the selected protocol and wherein the correlating includes correlating the first plurality of the fields of the first database to the second plurality of the fields of the second database based on the categories of the fields.

9. The method of claim 8 wherein the categories of the fields in the record structure of the one of the first and second databases are classified into a plurality of mapping classes and wherein the correlating further includes correlating the first plurality of the fields of the first database to the second plurality of the fields of the second database based on the plurality of mapping classes.

10. The method of claim 9 wherein the correlating further includes applying a plurality of mapping rules to the plurality of mapping classes.

11. The method of claim 10 wherein one of the mapping rules indicates that fields of the one of the first and second databases having a selected class, if absent in the other one of the first and second databases, are mapped to fields having a different selected class.

12. The method of claim 1 wherein the fields of the first and second databases are characterized by having selected properties and the identifying information identifies the selected properties of the fields in the record structure of one of the first and second databases according to the selected protocol, and wherein translating the data includes modifying the data based on the properties of the fields of the first and second databases.

13. The method of claim 1 further comprising transmitting the identifying information to a computer program wherein the computer program performs the correlating.

14. The method of claim 1 wherein the selected protocol classifies the fields in the record structure of the one of the first and second databases based on categories of the fields.

15. The method of claim 1 wherein the plurality of the records of the first database includes all of the records of the first database.

16. A computer implemented method of transferring data in a first database stored on a first computer to a second computer storing a second database, wherein the first and second databases store records of data and the first and second databases are each characterized by a record structure, the method comprising the steps of:
   initiating a data transfer session between the first and second databases,
   transmitting to a computer program information identifying the record structure of at least one of the first and second databases, the identifying information being provided substantially without user input,
   establishing a data transfer protocol based on the identifying information,
   transferring, according to the database transfer protocol, from the first database to the second database data stored in a plurality of fields of a plurality of the records of the first database,
   wherein the identifying information identifies the record structure according to a selected protocol, and
   wherein the selected protocol provides a syntax for identifying the characteristics of a field of the one of the first and second databases.

17. The method of claim 16 wherein establishing the data transfer protocol includes:
   correlating a second plurality of the fields of the first database to a third plurality of the fields of the second database to establish a field map, using the information identifying the record structure of one of the first and second databases.

18. The method of claim 17 wherein establishing the data transfer protocol further includes:
   determining the first-mentioned plurality of fields of the first database based on the second plurality of the fields of the first database, where the first-mentioned plurality of fields of the records of the first database is less than all of the fields of the records of the first database.

19. The method of claim 17 wherein establishing the data transfer protocol further includes:
   determining the plurality of records of the first database based on a selected criterion.

20. The method of claim 19 wherein the selected criterion includes a criterion for searching a first database and selecting records matching the selected criterion.

21. The method of claim 16 further comprising storing the transmitted data in the second database.

22. The method of claim 16 further comprising synchronizing at least one record of the second database with the transmitted data.

23. The method of claim 16 wherein the first database is stored on a first computer and the second database is stored on a second computer.

24. A computer implemented method of transferring data in a first database stored on a first computer to a second computer storing a second database, wherein the first and second databases store records of data and the first and second databases are each characterized by a record structure, the method comprising the steps of:
   transmitting to a computer program information identifying the record structure of at least one of the first and second databases, the information being generated substantially without user input, and the information identifying categories and properties of a plurality of fields of the record structure of the one of the first and second databases, a category identifying the type of information stored in a field, and a property identifying limits or rules imposed on data stored in a field,
   transferring from the first database to the second database data stored in a plurality of fields of a plurality of the records of the first database, and
   processing the transferred data using the identifying information,
   wherein the identifying information identifies the record structure according to a selected protocol, and
   wherein the selected protocol provides a syntax for identifying the characteristics of a field of the one of the first and second databases.

25. The method of claim 24 wherein the properties include a rule of data value for a field of the record structure of the one of the first and second databases.

26. The method of claim 24 wherein the properties include a size parameter for a field of the record structure of the one of the first and second databases.

27. The method of claim 24 wherein the processing includes synchronizing at least one record of the second database with the transmitted data.

28. The method of claim 24 wherein the first database is stored on a first computer and the second database is stored on a second computer.

29. Computer software resident on a computer readable medium for transferring data between a first database and a second database storing records of data, the first database being characterized by a first record structure determining fields of the records of the first database, and the second database being characterized by a second record structure determining fields of the records of the second database, the computer software containing instructions for:
establishing a field map relating the fields of the first and second databases, substantially without user input, by correlating a first plurality of the fields of the first database to a second plurality of the fields of the second database using information identifying the record structure of at least one of the first and second databases, and
translating the data stored in the first plurality of fields of a plurality of the records of the first database in accordance with the field map,
wherein the identifying information identifies the record structure according to a selected protocol, and
wherein the selected protocol provides a syntax for identifying the characteristics of a field of the one of the first and second databases.

30. The computer software of claim 29 further containing instructions for transmitting from the first database to the second database data stored in the plurality of fields of the plurality of the records of the first database.

31. The computer software of claim 30 wherein the data is translated before the data is transmitted.

32. The computer software of claim 30 further containing instructions for storing the transmitted data in the second database.

33. The computer software of claim 30 further containing instructions for synchronizing at least one record of the second database with the transmitted data.

34. The computer software of claim 30 wherein the first database is stored on a first computer and the second database is stored on a second computer.

35. The computer software of claim 29 wherein the first plurality of the records of the first database includes all of the records of the first database.

36. The computer software of claim 29 wherein the identifying information identifies categories of the fields in the record structure of the one of the first and second databases according to the selected protocol and wherein the correlating includes correlating the first plurality of the fields of the first database to the second plurality of the fields of the second database based on the categories of the fields.

37. The computer software of claim 36 wherein the categories of the fields in the record structure of the one of the first and second databases are classified into a plurality of mapping classes and wherein the correlating further includes correlating the first plurality of the fields of the first database to the second plurality of the fields of the second database based on the plurality of mapping classes.

38. The computer software of claim 37 wherein the correlating farther includes applying a plurality of mapping rules to the plurality of mapping classes.

39. The computer software of claim 38 wherein one of the mapping rules indicates that fields of the one of the first and second databases having a selected class, if absent in the other one of the first and second databases, are mapped to fields having a different selected class.

40. The computer software of claim 29 wherein the fields of the first and second databases are characterized by having selected properties and the identifying information identifies the selected properties of the fields in the record structure of one of the first and second databases according to the selected protocol, and wherein translating the data includes modifying the data based on the properties of the fields of the first and second databases.

41. The computer software of claim 29 wherein the computer software includes a computer program and the computer software farther containing instructions for transmitting the identifying information to the computer program wherein the computer program performs the correlating.

42. The computer software of claim 29 wherein the selected protocol classifies the fields in the record structure of the one of the first and second databases based on categories of the fields.

43. Computer software resident on a computer readable medium for transferring data in a first database stored on a first computer to a second computer storing a second database, wherein the computer software includes a computer program and the computer software, wherein the first and second databases store records of data and the first and second databases are each characterized by a record structure, the computer software containing instruction for:
initiating a data transfer session between the first and second databases,
transmitting to the computer program information identifying the record structure of at least one of the first and second databases, the identifying information being provided substantially without user input,
establishing a data transfer protocol based on the identifying information,
transferring, according to the database transfer protocol, from the first database to the second database data stored in a plurality of fields of a plurality of the records of the first database,
wherein the identifying information identifies the record structure according to a selected protocol, and
wherein the selected protocol provides a syntax for identifying the characteristics of a field of the one of the first and second databases.

44. The computer software of claim 43 wherein establishing the data transfer protocol includes:
correlating a second plurality of the fields of the first database to a third plurality of the fields of the second database to establish a field map, using the information identifying the record structure of one of the first and second databases.

45. The computer software of claim 44 wherein establishing the data transfer protocol further includes:
determining the first-mentioned plurality of fields of the first database based on the second plurality of the fields of the first database, where the first-mentioned plurality of fields of the records of the first database is less than all of the fields of the records of the first database.

46. The computer software of claim 44 wherein establishing the data transfer protocol further includes:
determining the plurality of records of the first database based on a selected criterion.

47. The computer software of claim 46 wherein the selected criterion includes a criterion for searching a first database and selecting records matching the selected criterion.

48. The computer software of claim 43 further containing instructions for storing the transmitted data in the second database.

49. The computer software of claim 43 further containing instructions for synchronizing at least one record of the second database with the transmitted data.

50. The computer software of claim 43 wherein the first database is stored on a first computer and the second database is stored on a second computer.

51. The computer software of claim 43 wherein the plurality of the records of the first database includes all of the records of the first database.

52. Computer software resident on a computer readable medium for transferring data in a first database stored on a first computer to a second computer storing a second database, wherein the first and second databases store records of data and the first and second databases are each characterized by a record structure, the computer software containing instruction for:

transmitting to a computer program information identifying the record structure of at least one of the first and second databases, the information being generated substantially without user input, and the information identifying categories and properties of a plurality of fields of the record structure of the one of the first and second databases, a category identifying the type of information stored in a field, and a property identifying limits or rules imposed on data stored in a field, transferring from the first database to the second database data stored in a plurality of fields of a plurality of the records of the first database, and processing the transferred data using the identifying information, wherein the identifying information identifies the record structure according to a selected protocol, and wherein the selected protocol provides a syntax for identifying the characteristics of a field of the one of the first and second databases.

53. The computer software of claim 52 wherein the properties include a rule of data value for a field of the record structure of the one of the first and second databases.

54. The computer software of claim 52 wherein the properties include a size parameter for a field of the record structure of the one of the first and second databases.

55. The computer software of claim 52 wherein the processing includes synchronizing at least one record of the second database with the transmitted data.

56. The computer software of claim 52 wherein the first database is stored on a first computer and the second database is stored on a second computer.

* * * * *

UNITED STATES PATENT AND TRADEMARK OFFICE
CERTIFICATE OF CORRECTION

| | | |
|---|---|---|
| PATENT NO. | : 6,925,477 B1 | Page 1 of 2 |
| APPLICATION NO. | : 09/052769 | |
| DATED | : August 2, 2005 | |
| INVENTOR(S) | : Darryl G. Champagne, Robert C. Daley and Glen A. Walant | |

It is certified that error appears in the above-identified patent and that said Letters Patent is hereby corrected as shown below:

Title page,
Item [56], References Cited, OTHER PUBLICATIONS,
"Zahn" reference, "87x115" should be -- 87-115 --.
"Greenberg" reference, "interface" should be -- Interface --.
"Jacobs" reference, "1993" should be -- 1983 --.
"Larson" reference, before "Theory" insert -- A --.
"Product Comparison" reference, "sharp" should be -- Sharp --.
"Webster's" reference, after "1166" delete the comma.

Drawings,
Figure 2, "Data Transfer Device 18" should be -- Data Transfer Device 28 --.
Figure 3, Reference Box 305 should read -- One of the two databases initiates the data transfer session --.

Column 1,
Line 3, insert the title: -- REFERENCE TO MICROFICHE APPENDIX --.

Column 2,
Line 57, "databases" should be -- database --.

Column 4,
Line 21, "computers" should be -- computer --.

Column 10,
Line 17, before "the '751" insert -- in --.
Line 33, "send" should be -- sent --.

Column 13,
Line 1, "claim 30" should be -- claim 29 --.
Line 2, "farther" should be -- further --.

UNITED STATES PATENT AND TRADEMARK OFFICE
CERTIFICATE OF CORRECTION

PATENT NO. : 6,925,477 B1
APPLICATION NO. : 09/052769
DATED : August 2, 2005
INVENTOR(S) : Darryl G. Champagne, Robert C. Daley and Glen A. Walant It is certified that error appears in the above-identified patent and that said Letters Patent is hereby corrected as shown below:

Column 14,
Line 3, "farther" should be -- further --.

Signed and Sealed this

Twentieth Day of June, 2006

JON W. DUDAS
*Director of the United States Patent and Trademark Office*